(12) United States Patent  
Miyata

(10) Patent No.: US 10,891,746 B2  
(45) Date of Patent: Jan. 12, 2021

(54) THREE-DIMENSIONAL GEOMETRY MEASUREMENT APPARATUS AND THREE-DIMENSIONAL GEOMETRY MEASUREMENT METHOD

(71) Applicant: Mitutoyo Corporation, Kanagawa (JP)

(72) Inventor: Kaoru Miyata, Ibaraki (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 16/555,285

(22) Filed: Aug. 29, 2019

(65) Prior Publication Data

US 2020/0090356 A1  Mar. 19, 2020

(30) Foreign Application Priority Data

Sep. 14, 2018 (JP) .................................. 2018-172951

(51) Int. Cl.
| | |
|---|---|
| *G06T 7/521* | (2017.01) |
| *G06T 7/70* | (2017.01) |
| *G06T 7/60* | (2017.01) |
| *G01B 11/25* | (2006.01) |
| *G06T 7/00* | (2017.01) |

(52) U.S. Cl.  
CPC .............. *G06T 7/521* (2017.01); *G01B 11/25* (2013.01); *G06T 7/0002* (2013.01); *G06T 7/60* (2013.01); *G06T 7/70* (2017.01); *G01B 11/2513* (2013.01); *G06T 2207/30168* (2013.01)

(58) Field of Classification Search  
CPC ................ G01B 11/25; G01B 11/2513; G06T 2207/30168; G06T 7/0002; G06T 7/521; G06T 7/60; G06T 7/70  
See application file for complete search history.

(56) References Cited

U.S. PATENT DOCUMENTS

| | | | |
|---|---|---|---|
| 2007/0008538 A1* | 1/2007 | Kiraly | G01N 21/896 356/430 |
| 2007/0031029 A1* | 2/2007 | Sasaki | G01B 11/25 382/154 |
| 2009/0097039 A1* | 4/2009 | Kawasaki | G01B 11/2509 356/603 |
| 2017/0241767 A1* | 8/2017 | Miyata | G06K 9/4604 |

FOREIGN PATENT DOCUMENTS

JP  2009-094295 A  4/2009

* cited by examiner

*Primary Examiner* — Jessica M Prince  
(74) *Attorney, Agent, or Firm* — Rankin, Hill & Clark LLP

(57) ABSTRACT

A three-dimensional geometry measurement apparatus includes: a projection part that projects a projection image onto an object to be measured; an image capturing part that generates a captured image by capturing the object to be measured on which the projection image is projected; a relationship identification part that identifies a projection pixel position having correspondence with a captured pixel position; and a defective pixel determination part that determines whether the pixel at the captured pixel position is a defective pixel on the basis of a positional relationship between a projection light beam starting from the projection part and passing through the pixel at the projection pixel position and a captured light beam starting from the image capturing part and passing through the pixel at the captured pixel position having correspondence.

11 Claims, 13 Drawing Sheets

→ x

THREE-DIMENSIONAL GEOMETRY MEASUREMENT APPARATUS AND THREE-DIMENSIONAL GEOMETRY MEASUREMENT METHOD

CROSS-REFERENCE TO RELATED APPLICATIONS

The present application claims priority to Japanese Patent Applications number 2018-172951, filed on Sep. 14, 2018. The contents of this application are incorporated herein by reference in their entirety.

BACKGROUND OF THE INVENTION

The present invention relates to a three-dimensional geometry measurement apparatus and a three-dimensional geometry measurement method for measuring a three-dimensional geometry of an object to be measured.

Methods for measuring an object to be measured without making any contact can be divided into two: a passive technique such as a stereo method; and an active technique such as a triangulation method, a time-of-flight method, and a confocal method. Among them, use of the triangulation method is increasing in various fields such as product quality management and reverse-engineering A light-pattern projecting method uses the principle of the triangulation method and performs a three-dimensional (3D) geometry measurement by projecting a pattern of stripes from a projector onto the object to be measured and then by capturing the pattern that changes along the geometry of the object to be measured with a camera. Japanese Unexamined Patent Application Publication No. 2009-094295 discloses a measurement apparatus for measuring a height of an electronic component based on a captured image obtained by imaging an optical cutting line when line light is projected onto the electronic component.

Because the light-pattern projecting method is capable of measuring a larger area at one time when projecting an image including a plurality of patterns of stripes on to the object to be measured, it enables a faster measurement of the 3D geometry.

In light-pattern projecting method, when a surface of the object to be measured is glossy, multiple reflections occur, that is, the projected light from the projector repeatedly reflects from a surface of the object to be measured. Due to the multiple reflections, there was a problem that measurement accuracy is reduced.

As methods to prevent the multiple reflections, a method of applying an anti-multiple-reflection spray over the surface of the object to be measured, a mask which cuts a part of the projected light from the projector in its light path, and the like have been employed. However, in the method of applying the anti-multi-reflection spray over the surface of the object to be measured, there was a problem that the number of man-hours for rinsing increased. There was another problem that the anti-multi-reflection spray cannot be applied in an environment where a high degree of cleanness needs to be maintained.

Also, the method of using the mask is associated with a problem that the measurement time is increased since the number of times that the pattern is projected onto the object to be measured needed to be increased to cut a part of the projected light from the projector. Further, in this method, there was another problem that different masks need to be created for each individual object to be measured. In addition to the multiple reflections, for example, there was another problem that the measuring accuracy is lowered due to blurring of an imaging system at edges of the object to be measured or at places where luminance change is large.

BRIEF SUMMARY OF THE INVENTION

This invention focuses on these points, and an object of the invention is to provide a three-dimensional geometry measurement apparatus and a three-dimensional geometry measurement method, which are capable of preventing a reduction of measurement accuracy caused by multiple reflections, blurring of the imaging system, or the like.

A three-dimensional geometry measurement apparatus according to the first aspect of the present invention is a three-dimensional geometry measurement apparatus that measures a three-dimensional geometry of an object to be measured by projecting, onto the object to be measured, a projection image including a light pattern in which luminance changes depending on a position, and includes: a projection part that projects the projection image onto the object to be measured; an image capturing part that generates a captured image capturing the object to be measured on which the projection image is projected; a relationship identification part that identifies a projection pixel position which is a position of a pixel of the projection image having correspondence with a captured pixel position which is a position of a pixel of the captured image; and a defective pixel determination part that determines whether or not the pixel at the captured pixel position is a defective pixel on the basis of a positional relationship between (i) a projection light beam starting from the projection part and passing through the pixel at the projection pixel position and (ii) a captured light beam starting from the image capturing part and passing through the pixel at the captured pixel position having correspondence with the projection pixel position.

A three-dimensional geometry measurement method according to the second aspect of the present invention is a three-dimensional geometry measurement method that measures a three-dimensional geometry of an object to be measured by projecting, onto the object to be measured, a projection image including a light pattern in which luminance changes depending on a position in a predetermined direction, the method includes steps of: projecting the projection image onto the object to be measured by a projection part; generating, by an image capturing part, a captured image by capturing the object to be measured on which the projection image is projected; identifying a projection pixel position which is a position of a pixel of the projection image having correspondence with a captured pixel position which is a position of a pixel of the captured image; and determining whether or not the pixel at the captured pixel position is a defective pixel on the basis of a positional relationship between (i) a projection light beam starting from the projection part and passing through the pixel at the projection pixel position and (ii) a captured light beam starting from the image capturing part and passing through the pixel at the captured pixel position having correspondence with the projection pixel position.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

First Embodiment

[Outline of a 3D Geometry Measurement Apparatus 100]

Figure 1A:
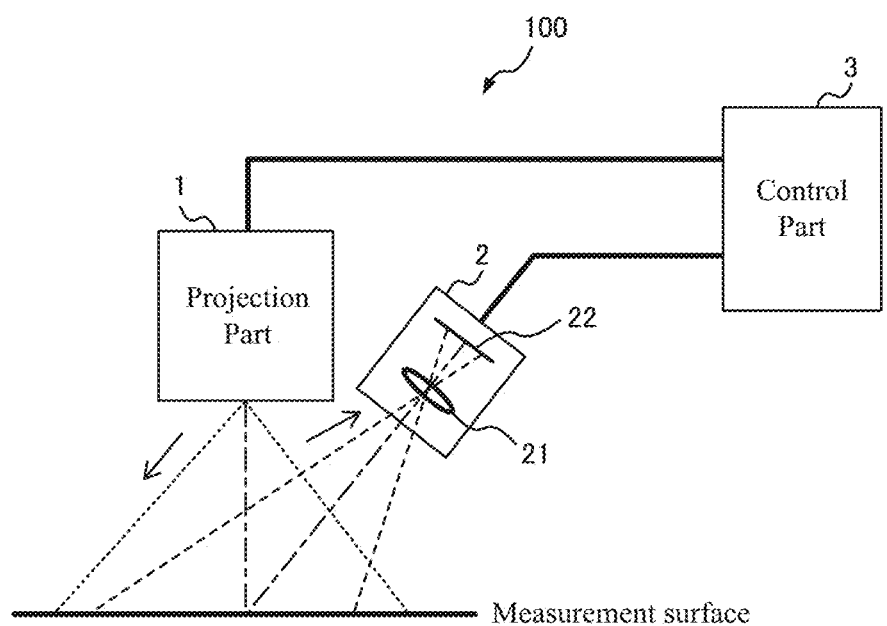
FIGS. 1A to 1C illustrate an outline of a 3D geometry measurement apparatus according to the first embodiment.
Figure 1B:
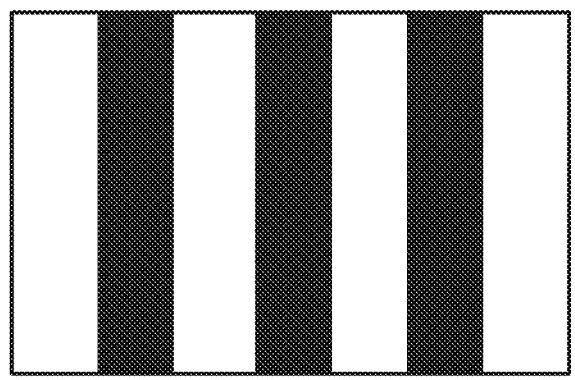
Figure 1C:
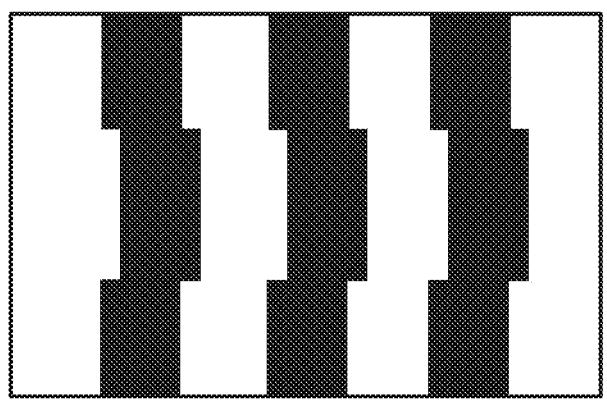

FIGS. 1A to 1C illustrate the outline of a 3D geometry measurement apparatus 100 according to the first embodiment. FIG. 1A shows a configuration of the 3D geometry measurement apparatus 100. The 3D geometry measurement apparatus 100 measures a 3D geometry of the object to be measured by projecting, onto the object to be measured, a projection image including light patterns in which luminance changes depending on a position in a predetermined direction. The light patterns are, for example, stripe patterns. Details of the light patterns will be described below. The 3D geometry measurement apparatus 100 includes a projection part 1, an image capturing part 2, and a control part 3.

The projection part 1 is a projection apparatus having a light source such as a light emitting diode or a laser, a projection lens, and a liquid crystal, a micro mirror, or the like. The projection part 1 projects a plurality of respectively different projection images including light patterns onto a measurement surface of the object to be measured.

The image capturing part 2 is a capturing apparatus that has a lens 21 and an imaging element 22, an optical filter (not shown), and the like. The image capturing part 2 generates a plurality of captured images by respectively capturing the object to be measured while the projection images are sequentially projected onto the object to be measured by the projection part 1. The image capturing part 2 is placed in such a manner that the optical axis of the image capturing part 2 and the optical axis of the projection part 1 form a predetermined angle.

The control part 3 measures a geometry of the object to be measured based on the captured images generated by the image capturing part 2. The control part 3 can be implemented by a computer, for example.

FIGS. 1B and 1C each show an example of a captured image generated by the image capturing part 2 while the projection part 1 projects the projection images onto the object to be measured. As shown in FIGS. 1B and 1C, the projection part 1 projects the projection images including light patterns in which luminance changes depending on a position in a predetermined direction onto a target for measurement. FIG. 1B shows the captured image generated by the image capturing part 2 when the projection part 1 projects, onto an even measurement surface, the projection images including light patterns composed of light projection regions in which light is projected and non-projection regions in which light is not projected. The white regions represent the light projection regions and the black regions represent the no-projection regions. When the measurement surface has no irregularities, the light patterns of the captured image generated by the image capturing part 2 match with the light patterns of the projection image.

FIG. 1C shows a captured image generated by the image capturing part 2 when the projection part 1 projects the light patterns onto a measurement surface having convex portions. In the captured image of FIG. 1C, the image of a part of the light pattern is deformed. In the captured image, the image of the light pattern is deformed by an amount according to the height of the convex portions. Therefore, the 3D geometry measurement apparatus 100 can measure the geometry of the object to be measured by identifying the height of each location of the convex portion based on the amount of deformation in the light pattern image in the captured image.

Figure 2A:
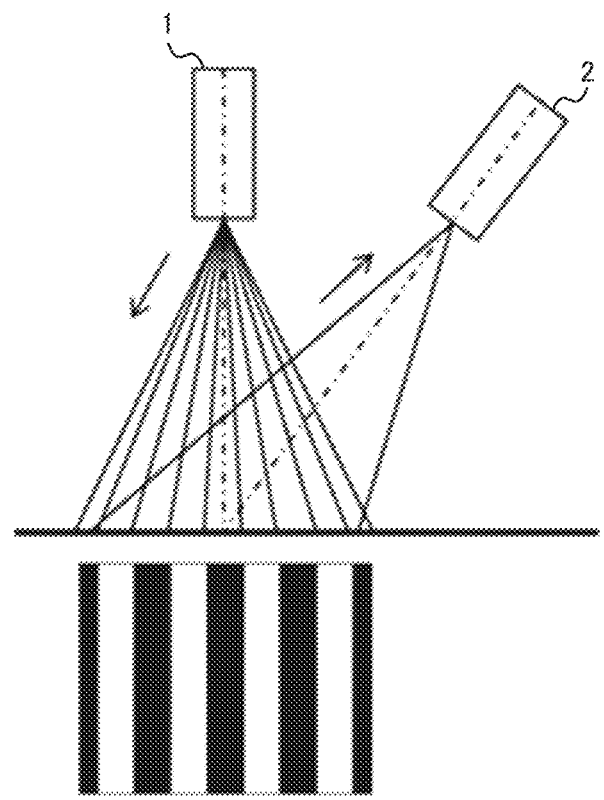
FIGS. 2A and 2B each show a projection image which a projection part projects onto an object to be measured.
Figure 2B:
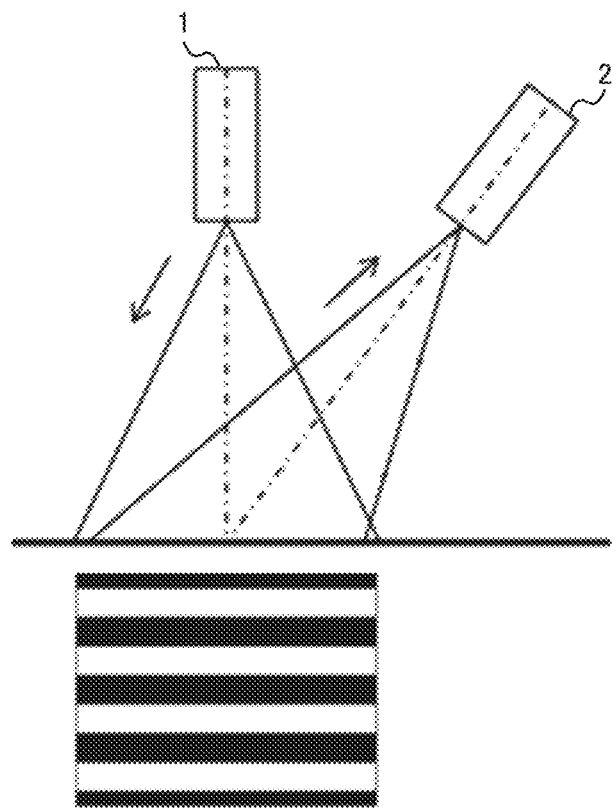

FIGS. 2A and 2B each show a projection image which the projection part 1 projects onto an object to be measured. FIG. 2A shows an example of a light pattern extending in the first direction, and FIG. 2B shows an example of a light pattern extending in the second direction. The projection part 1, as shown in FIG. 2A, projects the projection image including the light pattern extending in the first direction (this may be referred to as a vertical pattern below). The first direction is a direction orthogonal to the optical axis of the projection part 1 and orthogonal to the optical axis of the image capturing part 2. The projection part 1, as shown in FIG. 2B, may project the projection image including the light pattern extending in the second direction (this may be referred to as a horizontal pattern below). The second direction is a direction parallel to a plane including the optical axes of the projection part 1 and the image capturing part 2.

When the above-mentioned projection image including the light pattern is projected onto the object to be measured, the light pattern deviates in the width direction in accordance with the 3D geometry of the object to be measured, as shown in FIG. 1C. Also, the width of the light pattern fluctuates in accordance with the 3D geometry of the object to be measured. In the first captured image generated by the image capturing part 2 capturing the object to be measured while the projection image including the light pattern extending in the first direction is projected, (i) the direction corresponding to the deviation between the direction of the optical axis of the projection part 1 and the direction of the optical axis of the image capturing part 2 and (ii) the direction of the deviation in the width direction of the light pattern match one another. That is, (i) a direction of an image for a line segment generated by projecting a line segment connecting the starting point of the optical axis of the projection part 1 and a starting point of the image capturing part 2 onto a plane where the object to be measured is placed and (ii) the direction of the deviation in the width direction of the light pattern match one another. Therefore, in the first captured image, the sensitivity to detect the deviation of the light pattern in the width direction and the like is high. For this reason, resolution is improved in the measurement of the 3D geometry of the object to be measured.

Meanwhile, in the second captured image being generated by the image capturing part 2 capturing the object to be measured while the projection image including the light pattern extending in the second direction, the direction corresponding to the deviation between the direction of the optical axis of the projection part 1 and the direction of the optical axis of the image capturing part 2 and the direction of the deviation in the width direction of the light pattern are orthogonal to one another. That is, (i) the direction of an image for the line segment generated by projecting the line segment connecting the starting point of the projection part 1 and the starting point of the image capturing part 2 onto the plane where the object to be measured is placed and (ii) the direction of the deviation in the width direction of the light pattern are orthogonal. Therefore, the measurement resolution of the second captured image is significantly lowered in the measurement of the 3D geometry of the object to be measured, compared to the first captured image, and the 3D geometry measurement apparatus 100 cannot accurately measure the geometry.

The 3D geometry measurement apparatus 100 identifies the 3D geometry of the object to be measured by analyzing the light pattern projected on the object to be measured. However, when the surface of the object to be measured is glossy, there was a problem that measurement accuracy is reduced due to the multiple reflections caused by projected light from the projection part 1 being multiply reflected. In addition to multiple reflections, for example, there was a problem that the measuring accuracy is lowered due to blurring of an imaging system at edges of the object to be measured or at places where luminance change is large. Here, a position of the pixel of the projection part 1 is referred to as a projection pixel position, and a position of the pixel of the image capturing part 2 is referred to as a captured pixel position. As will be described in detail below, the 3D geometry measurement apparatus 100 determines whether or not a pixel of the captured image is a defective pixel affected by the multiple reflections or the like, on the basis of a positional relationship between (i) a projection light beam starting from the projection part 1 and passing through the pixel at the projection pixel position and (ii) a captured light beam starting from the image capturing part 2 and passing through the pixel at the captured pixel position.

Figure 3:
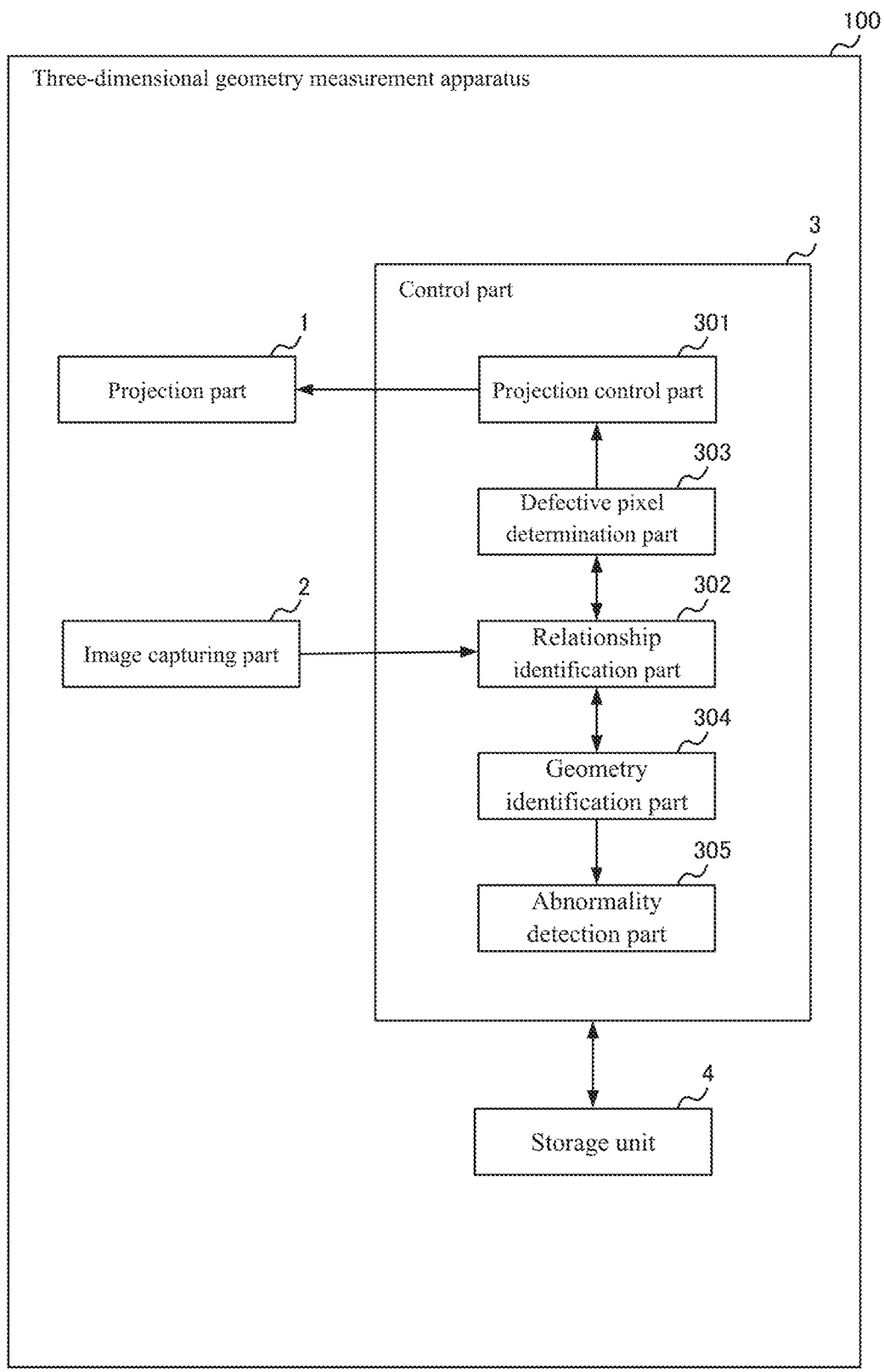
FIG. 3 shows a configuration of the 3D geometry measurement apparatus.

FIG. 3 shows a configuration of the 3D geometry measurement apparatus 100. The 3D geometry measurement apparatus 100 includes the projection part 1, the image capturing part 2, the control part 3, and a storage unit 4. The storage unit 4 includes a storage medium including a hard disk, a read only memory (ROM), a random access memory (RAM), and the like. The storage unit 4 stores programs to be executed by the control part 3. The control part 3 is, for example, a central processing unit (CPU) and functions as a projection control part 301, a relationship identification part 302, a defective pixel determination part 303, a geometry identification part 304, and an abnormality detection part 305 by executing the programs stored in the storage unit 4.

The projection control part 301 generates control signals for projecting the projection images including light patterns onto the object to be measured and inputs the generated control signals into the projection part 1. The projection control part 301 controls a circuit for switching the projection part 1 ON/OFF for each pixel, and thus the projection control part 301 is capable of projecting a portion of the pixels of the projection part 1 onto the object to be measured. Hereinafter, examples of light patterns which the projection control part 301 projects will be explained while referring to FIGS. 4A to 4F and FIGS. 5A to 5D.

[Types of Light Patterns]

FIGS. 4A to 4F respectively show examples of types of projection images which the projection control part 301 projects. In FIGS. 4A to 4E the black regions represent no-projection regions where the projection part 1 does not project light, and the white regions represent light-projection regions where the projection part 1 projects light.

Figure 4A:
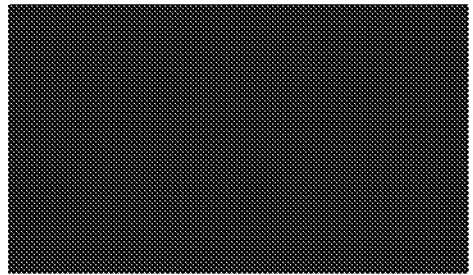
FIGS. 4A to 4F respectively show examples of types of projection images which a projection control part projects.
Figure 4B:
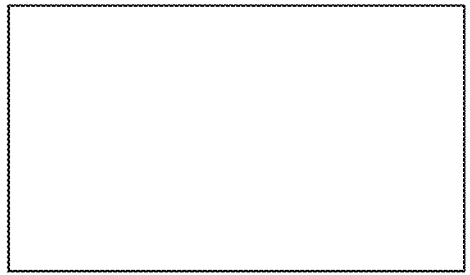
Figure 4C:
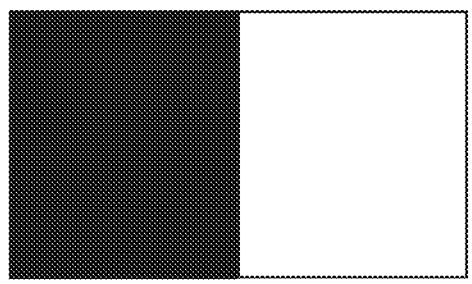
Figure 4D:
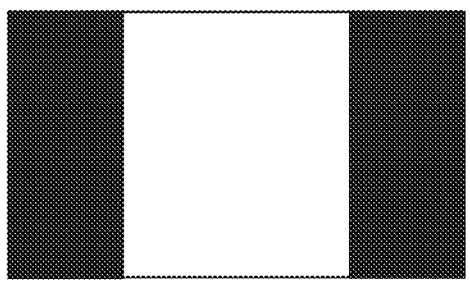
Figure 4E:
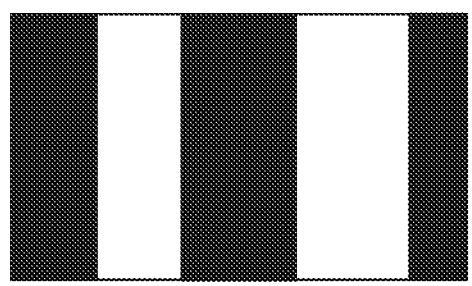
Figure 4F:
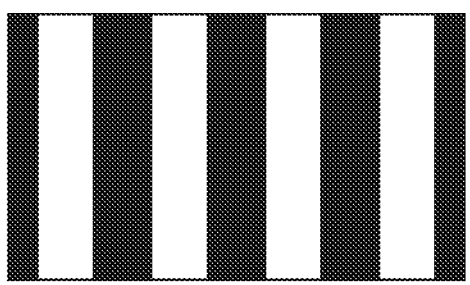
Figure 5A:
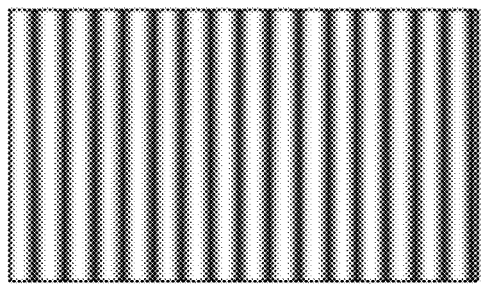
FIGS. 5A to 5D respectively show examples of gradation light patterns having sinusoidal luminance distributions.
Figure 5B:
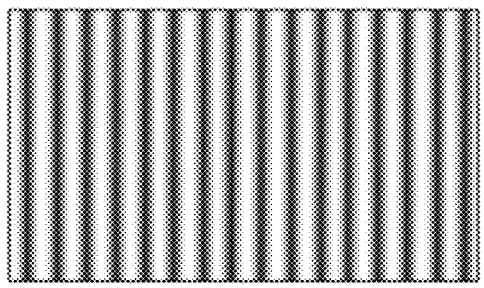
Figure 5C:
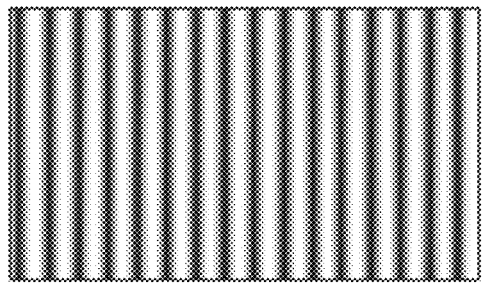
Figure 5D:
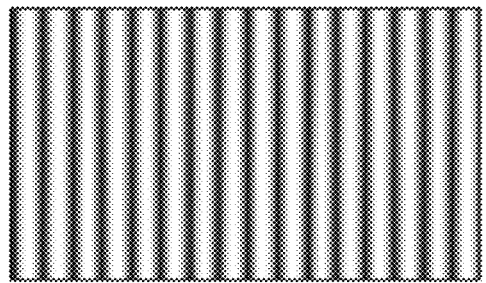

FIG. 4A shows a standard pattern by which light is not projected onto any part of the object to be measured (i.e. an all-black pattern). FIG. 4B shows a standard pattern by which light is projected onto the entire object to be measured (i.e. an all-white pattern). FIGS. 4C to 4F show the binary light patterns, which are composed of a light-projection region and a no-projection region and in which the stripes that have a different widths for each projection image are arranged in the same direction. The light patterns shown in FIGS. 4A to 4F correspond to Gray codes and are used for identifying positions of pixels in the captured image. Details thereof will be described below.

FIGS. 5A to 5D respectively show examples of gradation light patterns having sinusoidal luminance distributions and being projected onto the object to be measured by the projection control part 301. The gradation light patterns are light patterns in which the luminance changes depending on a position in a predetermined direction. In the example of the gradation light patterns of FIGS. 5A to 5D, the luminance changes in a sinusoidal manner from the white region to the black region along the width direction of the stripes. Intervals between the stripes in the gradation light patterns of FIGS. 5A to 5D are constant, and spatial frequency of the stripes in the gradation light patterns is, for example, four times the spatial frequency of the binary light patterns of FIG. 4F.

The gradation light patterns of FIGS. 5A to 5D are different from each other in the point that the phases of the sine waves indicating the luminance distribution differ by 90 degrees from each other, and their luminance distributions are otherwise the same. In the present embodiment, the projection control part 301 projects a total often projection images: two standard patterns shown in FIGS. 4A and 4B, four binary light patterns shown in FIGS. 4C to 4F, and four gradation light patterns shown in FIGS. 5A to 5D. The gradation light patterns shown in FIGS. 5A to 5D, together with the light patterns shown in FIGS. 4A to 4F, are used for identifying the positions of pixels in the captured image.

[Identifying a Pixel of the Projection Image that Corresponds to a Pixel of the Captured Image]

The relationship identification part 302 identifies the projection pixel position which is the position of the pixel of the projection image having correspondence with the captured pixel position which is the position of the pixel of the captured image by analyzing gradation information of the light patterns of the captured image. If a pixel obtained by capturing a pixel A of the projection image is a pixel B of the captured image, the projection pixel position of the pixel A and the captured pixel position of the pixel B have correspondence with each other. The method for identifying correspondence between the pixels of the projection image and the captured image will be described below.

Figure 6:
FIG. 6 shows examples of Gray codes corresponding to binary light patterns shown in FIGS. 4C to 4F.

As described above, the binary light patterns shown in FIGS. 4C to 4F correspond to Gray codes. FIG. 6 shows examples of Gray codes corresponding to the binary light patterns shown in FIGS. 4C to 4F. By associating Os in the Gray codes with the no-projection regions and 1s with the light-projection regions, the binary light patterns shown in FIGS. 4C to 4F are generated.

Each position in the x-direction in FIGS. 4A to 4F and 6 is represented by a code value, which is the combination of the numbers 0 or 1 at the respective positions in the Gray codes. Position 0 in FIG. 6 corresponds to the code value of "0000," position 1 corresponds to the code value of "0001" and position 15 corresponds to the code value of "1000."

The image capturing part 2 captures the object to be measured while the standard patterns shown in FIGS. 4A and 4B are respectively projected onto the object to be measured in the projection control part 301. The relationship identification part 302 calculates, for each pixel, an average value of two captured standard patterns as a median value. Similarly, regarding the captured images captured while the binary light patterns of FIGS. 4C to 4F are projected onto the object to be measured, the relationship identification part 302 identifies the code values of respective pixels by comparing the luminance values of respective pixels in four captured images with corresponding median values. By identifying the code values, the relationship identification part 302 can identify which binary stripe is reflected at each pixel position within the binary light pattern projected toward different positions. The relationship identification part 302 identifies at which position from Position 0 to Position 15 each pixel included in the captured image is included.

Further, the relationship identification part 302 respectively identifies the phases of the sine waves at the captured pixel position in the captured image when the gradation light patterns having sinusoidal luminance distributions are projected onto the object to be measured. The relationship identification part 302 identifies a pixel position of the projection image that matches the phase of the identified sine wave. Because the gradation light patterns of the projection image have periodicity, there are a plurality of pixel positions of the projection image that match the identified phases of the sine wave.

Therefore, the relationship identification part 302 identifies correspondence between pixel positions of the projection image and pixel positions of the captured image on the basis of the position at which each pixel is included, identified on the basis of the code values of the Gray codes that correspond to respective pixels of the captured image when the binary light patterns of FIGS. 4C to 4F are projected. The relationship identification part 302 identifies correspondence between the pixels of the captured image and the pixels of the projection image by selecting a correspondence included in the identified position on the basis of the Gray codes indicated by the binary light patterns among the plurality of correspondences identified by analyzing the gradation information of the gradation light patterns. Where k(=1, 2) is an index representing the first and the second directions, the relationship identification part 302 identifies a coordinate of a corresponding pixel $(i_p, j_p)$ of the projection part 1 for each pixel $(i, j)$ of the image capturing part 2 as follows.

$$(i_p, j_p) = \left( \frac{p_1 I_{AP,1}(i, j)}{2\pi}, \frac{p_2 I_{AP,2}(i, j)}{2\pi} \right)$$ [Equation 1]

$I_{AP,k}(i, j)$, where k=1, 2, is an absolute phase value of an absolute phase image of a captured image being captured while the vertical pattern and the horizontal pattern having sinusoidal luminance distributions are projected, $p_k$ is the number of pixels included in one cycle of stripes of the light pattern of the projection part 1.

In place of using the projection image including the binary light patterns shown in FIG. 4, the relationship identification part 302 may use the projection image including the gradation light patterns. The relationship identification part 302 may be configured to identify correspondence between the pixel of the captured image and the pixel of the projection image by sequentially projecting a plurality of projection images having the gradation light patterns with sinusoidal luminance distributions and a stripe pattern whose cycles of stripes are different from those of FIGS. 5A to 5D, in addition to the projection images having the gradation light patterns of FIGS. 5A to 5D.

For example, the projection part 1 may be configured to project a plurality of projection images having the first periodic gradation light patterns, project a plurality of projection images having the second periodic gradation light patterns, and project a plurality of projection images having the third periodic gradation light patterns. In this case, the projection part 1 can identify the geometry of the object to be measured by projecting the projection image having the sinusoidal luminance distributions onto the object to be measured. Further, a plurality of projection images having the first to the third periodic gradation light patterns may be projected as the gradation light patterns extending in the first and the second directions.

[Multiple Reflections]

Figure 7A:
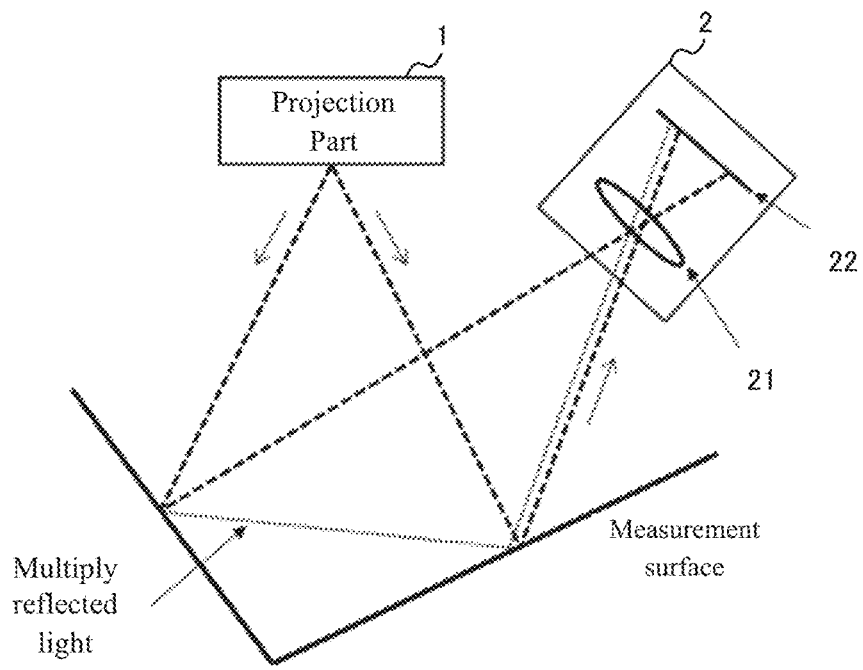
FIGS. 7A and 7B each illustrate multiple reflections.
Figure 7B:
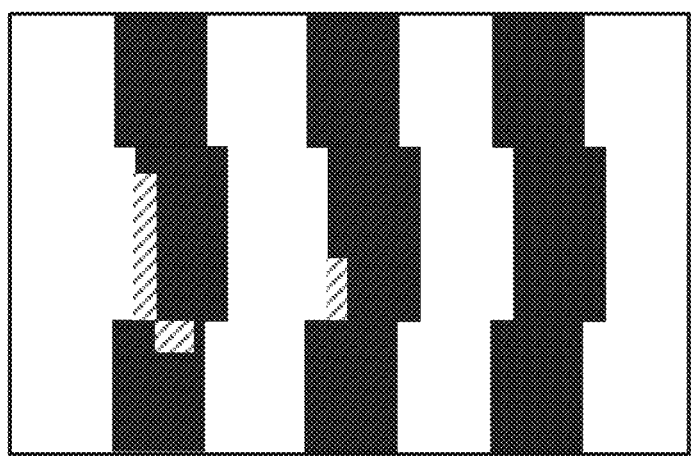

The defective pixel determination part 303 determines whether or not the pixel at the captured pixel position is a defective pixel due to multiple reflections or the like. FIGS. 7A and 7B each illustrate multiple reflections. When the object to be measured is glossy and has a complicated shape, light emitted by the projection part 1 may enter the image capturing part 2 after being repeatedly reflected multiple times on the surface to be measured. In this case, as shown in FIG. 7A, the light emitted by the projection part 1 enters one pixel of the imaging element 22 via two or more paths.

Specifically, the light entering the imaging element 22 includes direct light, which is the light emitted by the projection part 1 and which directly enters the image capturing part 2 after being diffused and reflected on the surface to be measured, and multiply reflected light, which enters the image capturing part 2 after being subjected to multiple reflections. As a result, in the captured image captured by the image capturing part 2, a pixel having a luminance value corresponding to black when there is no multiply reflected light may have a luminance value corresponding to white. In particular, multiple reflection is likely to occur when the object to be measured contains metal or the like which is likely to cause random reflection.

FIG. 7B shows an example of a captured image affected by multiple reflections. FIG. 7B corresponds to FIG. 1C, but due to the influence of multiply reflected light, the shaded portions have luminance which is different from the luminance in FIG. 1C. Also, due to the influence of multiply reflected light, distortion or the like may occur in the sinusoidal waveform shown in the luminance distributions of the gradation light patterns.

[Determining Defective Pixels]

Figure 8:
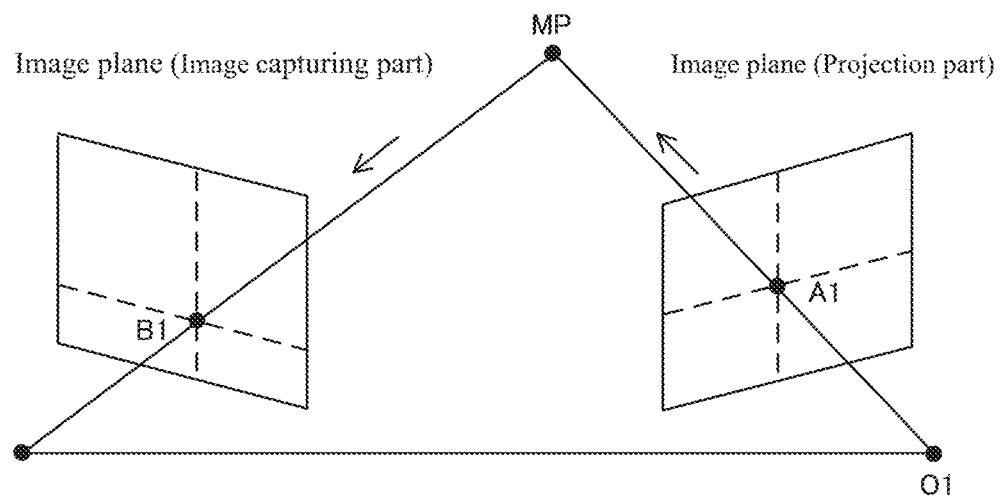
FIG. 8 shows a light path of direct reflection light.
Figure 9:
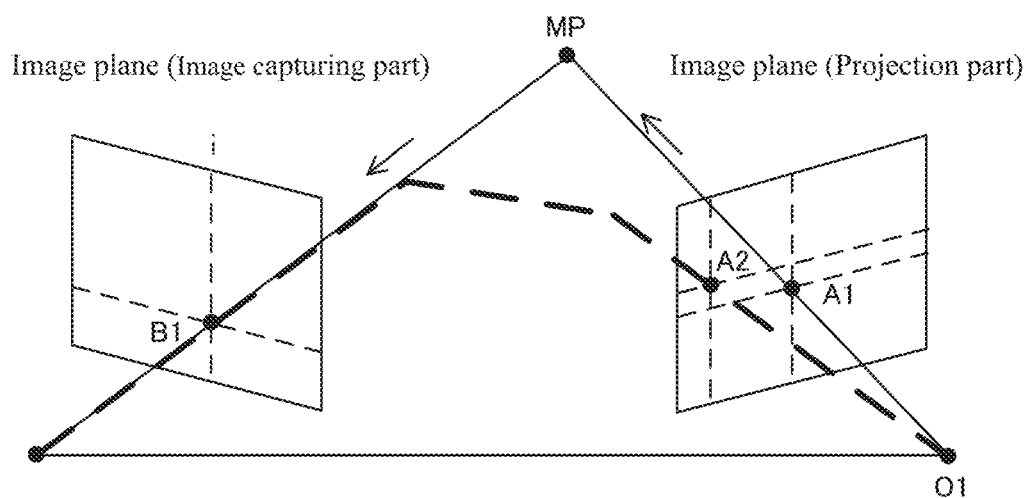
FIG. 9 shows a light path of multiply reflected light.

The defective pixel determination part 303 determines whether or not the pixel at the captured pixel position is a defective pixel on the basis of the positional relationship between (i) the projection light beam starting from the projection part 1 and passing through the pixel at the projection pixel position and (ii) the captured light beam starting from the image capturing part 2 and passing through the pixel at the captured pixel position having correspondence with the captured pixel position. FIGS. 8 and 9 are diagrams for explaining the principle of the determination of defective pixels.

FIG. 8 shows a light path of direct reflection light. Light emitted from an optical center O1 of the projection part 1 passes through a projection pixel position A1 on an image plane of the projection part 1, and diffuses and reflects at one position MP on the object to be measured. The light reflected at the position MP passes through a captured pixel position B1 in an image plane of the image capturing part 2.

FIG. 9 shows a light path of multiply reflected light. It is assumed that a light passing through a projection pixel position A2 that is different from the projection pixel position A1 on the image plane of the projection part 1 becomes multiply reflected light which is reflected at a plurality of positions on the object to be measured. This multiply reflected light is indicated by the thick broken lines. The multiply reflected light passes through the captured pixel position B1 in the image plane of the image capturing part 2.

As shown in FIG. 8, in the case of the direct reflected light reflected only once from the object to be measured, the projection light beam passing through the pixel of the projection pixel position A1 and the captured light beam passing through the captured pixel position B1 intersect at one measurement point MP on the object to be measured. The light passing through the pixel at the projection pixel position A2 reaches the captured pixel position B1 due to the occurrence of multiple reflections reflecting from the plurality of positions on the object to be measured, but when multiple reflections do not occur, the light passing through the projection pixel position A2 does not reach the captured pixel position B1. That is, if multiple reflections do not occur, the projection light beam passing through the projection pixel position A2 does not intersect with the captured light beam passing through the captured pixel position B1. By using this characteristic, the defective pixel determination part 303 determines whether a pixel is a defective pixel or not.

Figure 10:
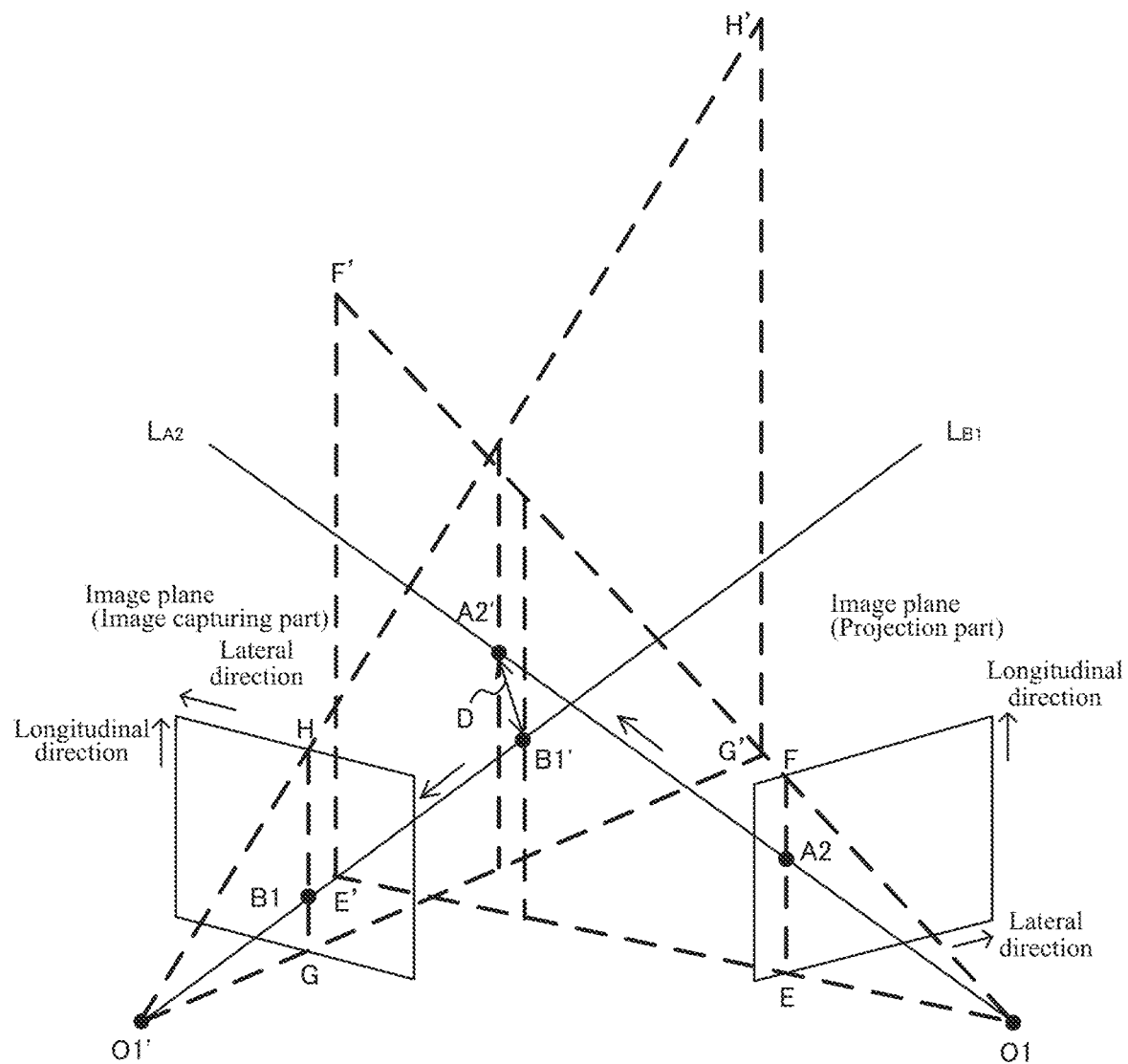
FIG. 10 illustrates a method of determining a defective pixel by a defective pixel determination part.

FIG. 10 illustrates a method of determining the defective pixel by the defective pixel determination part 303. The defective pixel determination part 303 identifies a positional relationship between the projection light beam and the captured light beam as follows.

[Calculating 3D Position on Captured Light Beam]

The defective pixel determination part 303 identifies a captured light beam $L_{B1}$ starting from the image capturing part 2 and passing through a captured pixel position B1($i, j$). Since the orientation of the image capturing part 2 is constant, the captured light beam $L_{B1}$ starting from the optical center (O1 in FIG. 10) of the projection part 1 and passing through the captured pixel position B1($i, j$) is uniquely determined by the arrangement of the lens 21. Information for identifying the captured light beam $L_{B1}$ is stored in the storage unit 4 in advance, and the defective pixel determination part 303 reads the information for identifying the captured light beam $L_{B1}$ from the storage unit 4. The information for identifying the captured light beam $L_{B1}$ is, for example, information showing directions of straight lines with the optical center of the projection part 1 as the origin or coordinates of points on the straight lines.

The defective pixel determination part 303 identifies a projection light beam plane in a predetermined direction passing through a projection pixel position A2($i_p, j_p$) being identified to have correspondence with the captured pixel position B1 by the relationship identification part 302. Specifically, the defective pixel determination part 303 identifies a projection light beam plane corresponding to a horizontal coordinate value $i_p$ of the projection pixel position A2($i_p, j_p$). The projection pixel position having the horizontal coordinate value $i_p$ exists on a straight line EF in the image plane of the projection part 1 shown in FIG. 10. Assuming that a straight line obtained by projecting the straight line EF to the object to be measured side from the optical center O1 of the projection part 1 as a starting point is a straight line E'F', a measurement point MP on the object to be measured corresponding to the projection pixel position having the horizontal coordinate value $i_p$ exists in a projection light beam plane including three points O1, E', and F'. The defective pixel determination part 303 identifies, as the first 3D position B1', a position where the projected light beam plane including the three points O1, E', and F' and a captured light beam $L_{B1}$ intersect. When multiple reflections or the like do not occur, the obtained intersection point B1' approximately matches with the measurement point MP on the object to be measured corresponding to the captured pixel position B1($i, j$).

[Calculating 3D Position on Projection Light Beam]

The defective pixel determination part 303 identifies a projection light beam $L_{A2}$ starting from the optical center O1 of the projection part 1 and passing through the projection pixel position A2($i_p, j_p$) of the projection part 1. Since the orientation of the projection part 1 is constant, the projection light beam $L_{A2}$ starting from the optical center O1 of the projection part 1 and passing through the projection pixel position A2($i_p, j_p$) of the projection part 1 is uniquely determined. Information for identifying the projection light beam $L_{A2}$ is stored in the storage unit 4 in advance, and the defective pixel determination part 303 reads the information for identifying the projection light beam $L_{A2}$ from the storage unit 4. The information for identifying the projection light beam $L_{A2}$ is, for example, information indicating directions of straight lines with the optical center O1' of the image capturing part 2 as the origin or coordinates of points on the straight lines.

Also, the defective pixel determination part 303 identifies a captured light beam plane passing through the captured pixel position B1($i, j$) in a direction specified in advance. More specifically, the defective pixel determination part 303 identifies the captured light beam plane corresponding to the horizontal coordinate value i of the captured pixel position B1($i, j$). The captured pixel position having the horizontal coordinate value i is on a straight line GH in the image plane of the image capturing part 2 shown in FIG. 10. The point at which the captured light beams passing through the plurality of captured pixel positions in the image plane of the image capturing part 2 intersect is denoted by O1'. Assuming that a straight line obtained by projecting the straight line GH to the object to be measured side from O1' as a starting point is a straight line G'H', the measurement point MP on the object to be measured corresponding to the captured pixel position having the horizontal coordinate value i exists in a captured light beam plane including three points O1', G', and H'. The defective pixel determination part 303 identifies, as the second 3D position A2', a position where the captured light beam plane including the three points O1', G', and H' and the projection light beam $L_{A2}$ intersect. When multiple reflections or the like do not occur, the obtained intersection point A2' approximately matches the measurement point MP on the object to be measured corresponding to the captured pixel position B1($i, j$).

[Comparing Two 3D Positions]

The defective pixel determination part 303 compares the first 3D position B1' on the captured light beam with the second 3D position A2' on the projection light beam to determine whether or not the pixel in the captured image is a defective pixel. When the first 3D position B1' and the second 3D position A2' are not affected by multiple reflections or the like, they approximately match with each other. On the other hand, in the case of being affected by multiple reflections or the like, the difference between the first 3D position B1' and the second 3D position A2' becomes large.

When a distance D between the first 3D position B1' and the second 3D position A2' shown in FIG. 10 exceeds a threshold value, the defective pixel determination part 303 determines that the pixel at the captured pixel position B1 is a defective pixel. On the other hand, when the distance D between the first 3D position B1' and the second 3D position A2' is equal to or less than the threshold value, the defective pixel determination part 303 determines that the pixel on the captured pixel position B1 is not a defective pixel. The threshold value is, for example, a statistical quantity of an error which occurs between the first 3D position B1' and the second 3D position A2' when the pixel at the captured pixel position B1 is not affected by multiple reflections or the like.

The geometry identification part 304 can identify the 3D position corresponding to the captured pixel position by using three coordinate values among four coordinate values included in one captured pixel position (i, j) and the projection pixel position ($i_p$, $j_p$) identified by the relationship identification part 302 as having correspondence with the captured pixel position. The above procedure is equivalent to comparing the 3D position obtained from the combination of the coordinate value i, the coordinate value j, and the coordinate value $i_p$ with the 3D position obtained from the combination of the coordinate value i, the coordinate value $i_p$, and the coordinate value $j_p$.

[Distance Between Captured Light Beam and Projection Light Beam]

Figure 11:
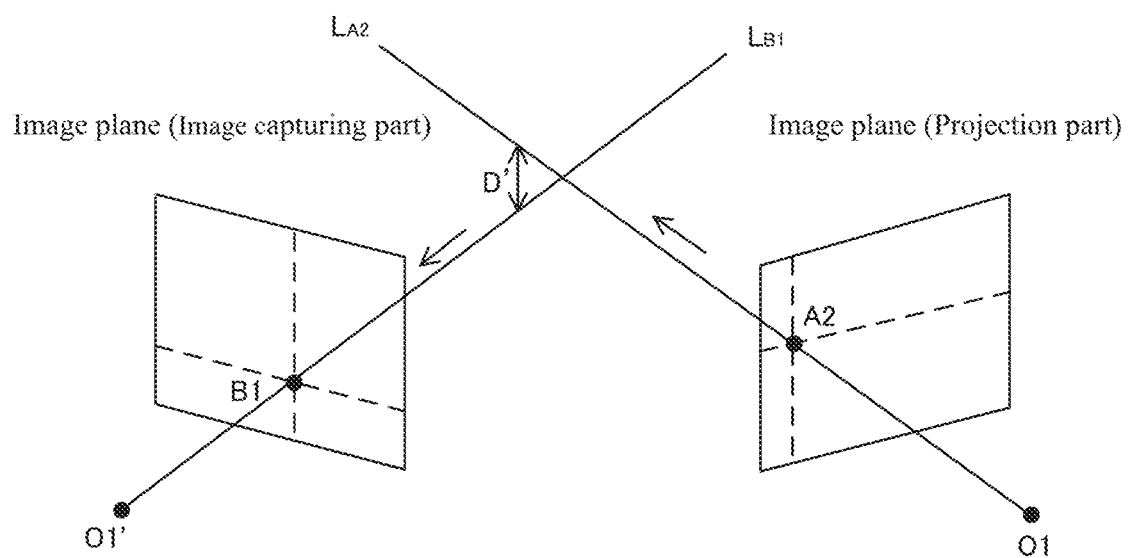
FIG. 11 illustrates another method of determining the defective pixel by the defective pixel determination part.

The defective pixel determination part 303 may determine whether or not the pixel at the captured pixel position is a defective pixel on the basis of a distance between the captured light beam and the projection light beam. FIG. 11 illustrates another method of determining the defective pixel by the defective pixel determination part 303. The defective pixel determination part 303 identifies a captured light beam $L_{B1}$ passing through the captured pixel position B1(i, j) of the image capturing part 2 and a projection light beam $L_{A2}$ passing through a projection pixel position A2($i_p$, $j_{B1}$) that the relationship identification part 302 identified to have correspondence with the captured pixel position B1. The defective pixel determination part 303 calculates the shortest distance D' between the captured light beam and the projection light beam.

When the obtained shortest distance D' exceeds a reference value, the defective pixel determination part 303 determines that the pixel at the captured pixel position B1 is the defective pixel. On the other hand, when the obtained shortest distance D' is equal to or less than the reference value, the defective pixel determination part 303 determines that the captured pixel position B1 is not a defective pixel. The reference value is, for example, based on a statistical quantity of the shortest distance D' when the pixel at the captured pixel position B1 is not affected by multiple reflections or the like.

[Using Normal Line]

Figure 12:
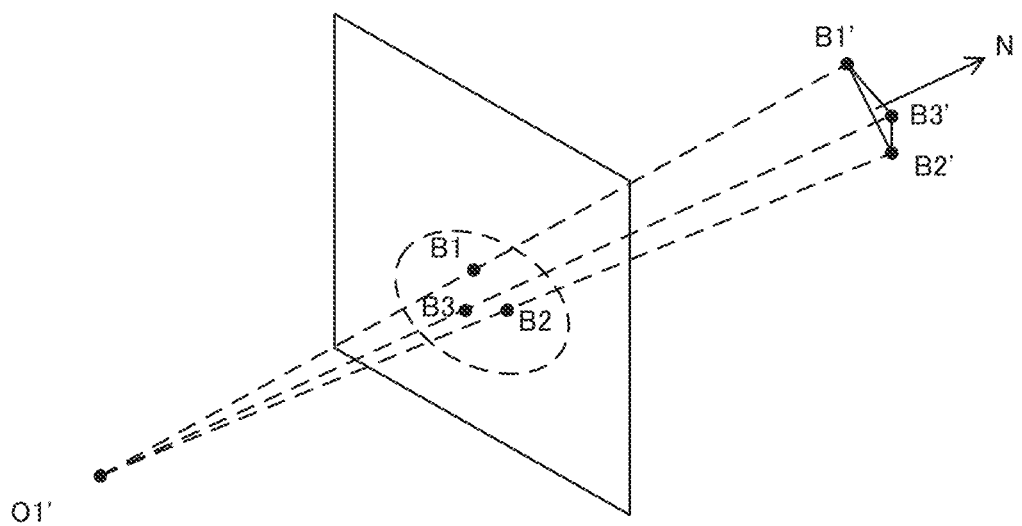
FIG. 12 illustrates still another method of determining the defective pixel by the defective pixel determination part.

FIG. 12 illustrates still another method of determining the defective pixel by the defective pixel determination part 303. The defective pixel determination part 303 may calculate the normal line of the measurement surface of the object to be measured on the basis of surrounding information of the captured pixel position of interest, and determine the defective pixel on the basis of the calculated normal line. The defective pixel determination part 303 selects three or more captured pixel positions B1 to B3 within a predetermined range from the captured pixel position of interest. The predetermined range is, for example, a range including several to several tens of captured pixel positions in the vicinity of the captured pixel position of interest. By the method described above, the defective pixel determination part 303 identifies the first 3D positions B1' to B3' corresponding to the selected captured pixel positions B1 to B3, respectively.

The defective pixel determination part 303 identifies a first plane determined by the identified first 3D positions B1' to B3'. When the three captured pixel positions B1 to B3 are selected, the defective pixel determination part 303 identifies the first plane including all of the first 3D positions B1' to B3'. When four or more captured pixel positions within the predetermined range from the captured pixel position of interest are selected, the defective pixel determination part 303 identifies four or more first 3D positions corresponding to the selected captured pixel positions. For example, the defective pixel determination part 303 identifies the first plane such that the sum of squares of distances from the identified four or more first 3D positions to the first plane is minimized.

In the same manner, the defective pixel determination part 303 identifies the second 3D positions corresponding to three or more captured pixel positions, respectively. The defective pixel determination part 303 identifies the second plane determined by the identified second 3D positions. The first 3D positions B1' to B3' are on an extension line obtained by extending the captured light beams from the image capturing part 2 passing through the selected captured pixel positions B1 to B3 toward the object to be measured, and the first plane is determined by these first 3D positions B1' to B3'. On the other hand, the second 3D positions are on extension lines obtained by extending the projection light beams from the projection part 1 passing through the projection pixel positions having correspondence with the selected captured pixel positions B1 to B3 toward the object to be measured, and the second plane is determined by these second 3D positions.

The defective pixel determination part 303 determines whether or not the captured pixel position is a defective pixel on the basis of correspondence between the first plane and the second plane. More specifically, the defective pixel determination part 303 compares the first normal line passing through the first plane with the second normal line passing through the second plane. For example, the defective pixel determination part 303 calculates at least one of a difference of inclination and a distance between the first normal line N passing through the center of gravity of the triangle composed of the first 3D positions B1' to B3' and the second normal line (not shown) passing through the center of gravity of the triangle composed of the second 3D positions.

When the difference between the inclination of the first normal line and the inclination of the second normal line is equal to or less than a predetermined angle, or the shortest distance between the first normal line and the second normal line is equal to or less than a predetermined distance, the defective pixel determination part 303 determines that the pixel at the captured pixel position of interest is not a defective pixel. On the other hand, when the difference of inclination between the first normal line and the second normal line exceeds a predetermined angle, or when the shortest distance between the first normal line and the second normal line exceeds the predetermined distance, the defective pixel determination part 303 determines that the pixel at the captured pixel position of interest is a defective pixel.

The predetermined angle and the predetermined distance are determined by persons skilled in the art according to the measurement accuracy required in the 3D geometry measurement. With such configurations, the defective pixel determination part 303 determines whether or not the pixel at the captured pixel position is a defective pixel in consideration of the surrounding pixels, and therefore the accuracy of determining defective pixels can be improved.

[Identify 3D Geometry]

The geometry identification part 304 identifies the 3D geometry of the object to be measured on the basis of pixel values of the captured pixel positions excluding the position of the pixel determined to be the defective pixel by the defective pixel determination part 303. The geometry identification part 304 obtains the respective first 3D positions identified by the defective pixel determination part 303 for the plurality of captured pixel positions of the captured image. The geometry identification part 304 identifies the 3D geometry of the object to be measured as an aggregate of the obtained 3D positions. At this time, the geometry identification part 304 does not include the first 3D positions corresponding to the captured pixel positions determined to be defective pixels by the defective pixel determination part 303 in the 3D geometry of the object to be measured.

[Averaging First 3D Position and Second 3D Position]

The geometry identification part 304 may identify the 3D geometry of the object to be measured by obtaining the respective 3D positions identified by the defective pixel determination part 303 for the plurality of captured pixel positions of the captured image. The geometry identification part 304 may identify the 3D geometry of the object to be measured on the basis of the mean value of the 3D coordinates of the first 3D positions and the mean value of the second 3D positions.

If a distance between the first 3D position and the second 3D position becomes large for the plurality of captured pixel positions, there is a possibility that, not the influence of the multiply reflected light or the like, but defects have occurred in a state of the projection part 1 or the image capturing part 2. For example, there is a possibility that a deviation in a positional relationship between the projection part 1 and the image capturing part 2 has occurred. Therefore, the abnormality detection part 305 may detect that the state of the projection part 1 or the image capturing part 2 of the 3D geometry measurement apparatus 100 is not appropriate, using the following method.

First, the abnormality detection part 305 obtains the distance between the first 3D position and the second 3D position corresponding to the captured pixel position from the defective pixel determination part 303. The abnormality detection part 305 obtains respective distances between the first 3D position and the second 3D position for the plurality of captured pixel positions, and calculates a statistical quantity such as a mean value of the obtained distances.

The abnormality detection part 305 detects an abnormality of the 3D geometry measurement apparatus 100 on the basis of the obtained statistical quantity. More specifically, the abnormality detection part 305 self-diagnoses that the alignment state of the projection part 1 and the image capturing part 2 of the 3D geometry measurement apparatus 100 is not appropriate when the obtained statistical quantity exceeds an allowable value. In this case, the abnormality detection part 305 displays on a display unit (not shown) a message indicating that a calibration of the alignment state of the projection part 1 and the image capturing part 2 needs to be made. Taking the desired accuracy of measurement into account, the allowable value is specified by a person skilled in the art, as appropriate.

On the other hand, when the obtained statistical quantity is equal to or less than the allowable value, the abnormality detection part 305 self-diagnoses that the alignment states of the projection part 1 and the image capturing part 2 of the 3D geometry measurement apparatus 100 are appropriate. With such configurations, the abnormality detection part 305 can self-diagnose whether or not the positional relation between the projection part 1 and the image capturing part 2 is deviated, and so the reliability of the 3D geometry measurement apparatus 100 can be improved.

[Defective Pixel Determination Process]

Figure 13:
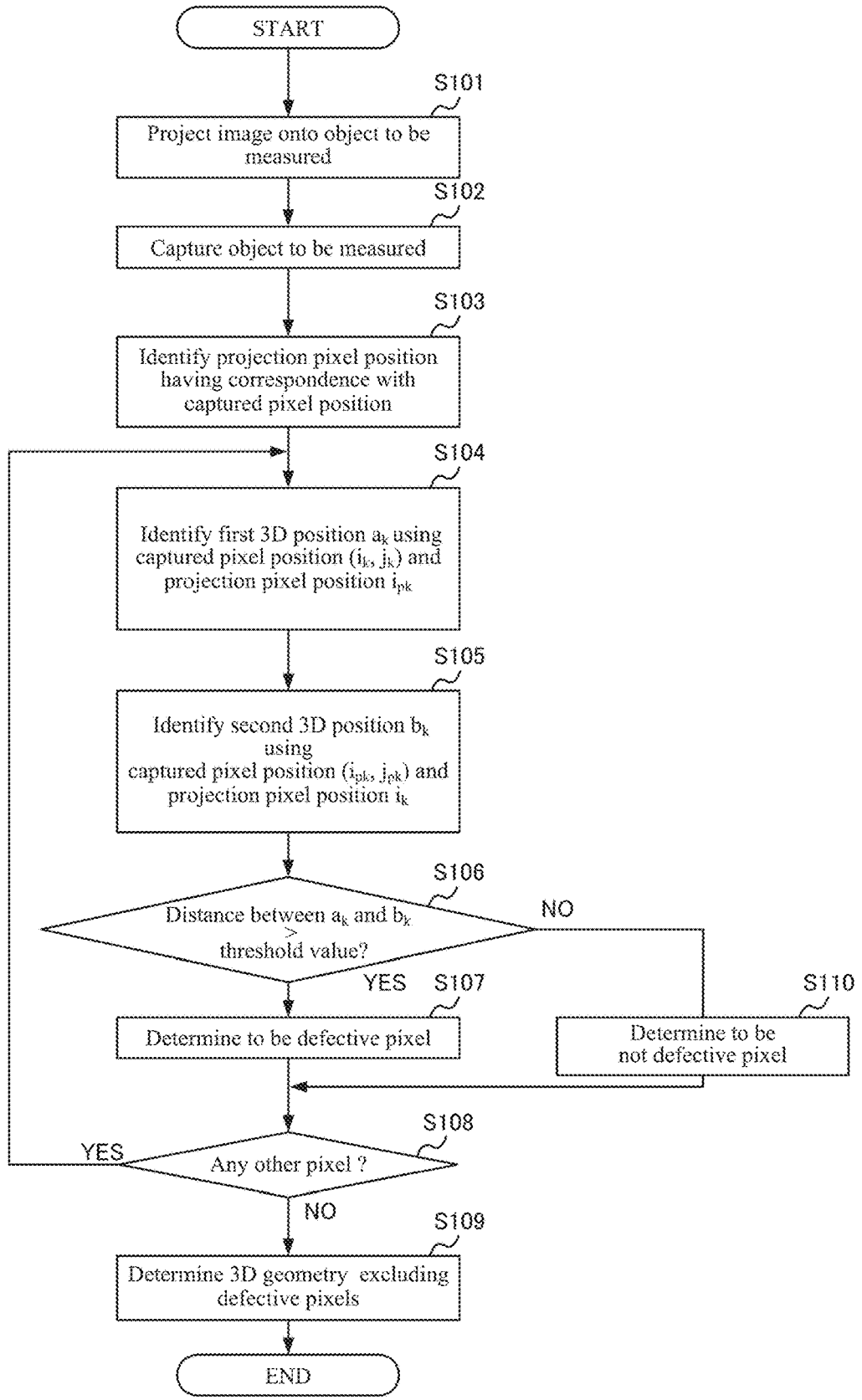
FIG. 13 is a flowchart for illustrating a procedure of a defective pixel determination process performed by the defective pixel determination part.

FIG. 13 is a flowchart for illustrating a procedure of a defective pixel determination process performed by the defective pixel determination part 303. This procedure starts, for example, when a user gives instructions to measure the 3D geometry of the object to be measured by using an operation key (not shown) of the 3D geometry measurement apparatus 100.

First, the projection control part 301 controls the projection part 1 to project the projection image onto the object to be measured (S101). Next, the image capturing part 2 captures the object to be measured while the projection image is projected onto the object to be measured (S102). The relationship identification part 302 identifies a projection pixel position that has correspondence with the captured pixel position (S103).

The defective pixel determination part 303 identifies a captured light beam $L_{BK}$ passing through a captured pixel position $B_k(i_k, j_k)$, where k=1, 2, . . . , of the image capturing part 2, and identifies a projection light beam plane corresponding to a coordinate value $i_{pK}$ which is one of the coordinate values of the projection pixel position $A_k(i_{pk}, j_{pk})$ identified by the relationship identification part 302 as a position having correspondence with the captured pixel position $B_k$. The defective pixel determination part 303 identifies, as the first 3D position $a_k$, a position at which the identified projection light beam plane and the captured light beam $L_{Bk}$ intersect (S104).

The defective pixel determination part 303 identifies a projection light beam $L_{Ak}$ passing through the same projection pixel position $A_k(i_{pk}, j_{pk})$, and identifies a captured light beam plane corresponding to a coordinate value $i_k$ which is one of the coordinate values of the captured pixel position $B_k(i_k, j_k)$. The defective pixel determination part 303 identifies, as the second 3D position $b_k$, a position at which the identified captured light beam plane and the projection light beam $L_{Ak}$ intersect (S105).

The defective pixel determination part 303 determines whether a distance between (i) the first 3D position $a_k$ on the captured light beam $L_{Bk}$ and (ii) the second 3D position $b_k$ on the projection light beam $L_{Ak}$ exceeds the threshold value (S106). When the distance between the first 3D position $a_k$ and the second 3D position $b_k$ exceeds the threshold value (YES in S106), the defective pixel determination part 303 determines that the pixel at the captured pixel position $B_k$ is a defective pixel (S107). The defective pixel determination part 303 determines whether or not there remains any pixel of the captured pixel position $B_k$ for which the determination of whether the pixel is defective has not been made (S108). When the defective pixel determination part 303 has determined for all of the pixels of the captured pixel position $B_k$ whether they are defective pixels or not (NO in S108), the geometry identification part 304 determines the 3D geometry of the object to be measured on the basis of the pixel values of the captured pixel position $B_k$ excluding the positions of the pixels determined to be defective pixels by the defective pixel determination part 303 (S109), and finishes the processing.

When the distance between the first 3D position $a_k$ on the captured light beam $L_{Bk}$ and the second 3D position $b_k$ on the projection light beam $L_{Ak}$ in the determination of step S106 is equal to or less than the threshold value (NO in S106), the defective pixel determination part 303 determines that the pixel at the captured pixel position $B_k$ is not a defective pixel (S110), and proceeds to the determination of step S108. If it is determined in the determination of step S108 that there remains a pixel at the captured pixel position $B_k$ for which the determination of whether the pixel is defective has not been made (Yes in S108), the defective pixel determination part 303 returns to processing of step S104 for another captured pixel position $B_k$.

According to the present embodiment, the defective pixel determination part 303 determines whether or not the pixel at the captured pixel position is a defective pixel on the basis of the positional relationship between (i) the projection light beam starting from the projection part 1 and passing through the pixel at the projection pixel position and (ii) the captured light beam starting from the image capturing part 2 and passing through the pixel at the captured pixel position having correspondence with the projection pixel position. With such configurations, the defective pixel determination part 303 can prevent the reduction of measurement accuracy occurring when the relationship identification part 302 erroneously identifies the projection pixel position having correspondence with the captured pixel position due to multiple reflections. Also, the defective pixel determination part 303 can prevent the reduction of measurement accuracy measuring 3D geometry occurring when the relationship identification part 302 erroneously identifies the correspondence due to, besides the multiple reflections, blurring of the image capturing part 2 at edges of the object to be measured or at places where the luminance change is large. As described above, the defective pixel determination part 303 can prevent measurement errors caused by various measurement defects.

[Re-Measurement Process]

Since defective pixels are often caused by multiply reflected light, it is possible to prevent the influence of multiply reflected light by projecting a projection image excluding projection pixels at positions detected as defective pixels. Therefore, when the defective pixel determination part 303 determines that the pixel at the captured pixel position is a defective pixel, the projection control part 301 may project a projection image (hereinafter, the first selected projection image) from which all of the pixels at the projection pixel positions having correspondence with the captured pixel positions determined to be defective pixels by the defective pixel determination part 303 are excluded from among the plurality of pixels included in the projection image onto the object to be measured again.

The relationship identification part 302 identifies a captured pixel position having correspondence with the projection pixel position of the first selected projection image. Since the defective pixels may be influenced by multiply reflected light, the projection control part 301 prevents the influence of the multiply reflected light by projecting the first selected projection image that does not include defective pixels. Therefore, the relationship identification part 302 can identify the correspondence between the projection pixel position and the captured pixel position more accurately.

It can be considered that the defective pixel due to multiple reflections occurs by simultaneously projecting the projection images including a number of pixels onto the object to be measured. Therefore, when the defective pixel determination part 303 determines that the pixel at the captured pixel position is a defective pixel, the projection control part 301 may project a projection image (hereinafter referred to as the second selected projection image) including only the pixels at the projection pixel positions having correspondence with the captured pixel positions determined to be defective pixels by the defective pixel determination part 303 from among the plurality of pixels included in the projection image onto the object to be measured again, and perform the measurement again in order to reduce the number of pixels to be simultaneously projected.

The relationship identification part 302 identifies a captured pixel position having correspondence with a projection pixel position of the second selected projection image. The projection control part 301 decreases the number of pixels that are simultaneously projected, compared to the case when all projection images are projected, by projecting the second selected projection image. The relationship identification part 302 can increase the number of pixels that are used for identifying the 3D geometry of the object to be measured by estimating the projection pixel position having correspondence with the captured pixel position of the pixel detected as a defective pixel by the defective pixel determination part 303 again.

[Variations]

In the above embodiment, the projection control part 301 projects projection patterns for a space coding method and a phase shift method as projection patterns in the first direction and the second direction. That is, the projection control part 301 projects, as light patterns exhibiting sinusoidal luminance distributions, the projection image having light patterns extending in the first direction and the projection image having light patterns extending in the second direction onto the object to be measured. Also, the projection control part 301 projects, as binary light patterns, the projection image having light patterns extending in the first direction and the projection image having light patterns extending in the second direction onto the object to be measured.

The present invention, however, is not limited to this. The light patterns in the first direction and the light patterns in the second direction do not need to be the same. For example, the projection control part 301 may project only the projection patterns for the phase shift method with respect to the projection patterns in the second direction. In this case, the projection control part 301 projects the projection image having light patterns exhibiting sinusoidal luminance distributions as light patterns extending in the second direction onto the object to be measured, and does not project the projection image having binary light patterns onto the object to be measured.

When the projection control part 301 projects the projection patterns in the second direction, the relationship identification part 302 obtains a phase value $I_{RP,2}(i, j)$. In this case, the absolute phase value $I_{AP,2}$ of the projection patterns in the second direction can be expressed by the following equation using a certain unknown integer m and a phase value $I_{AP,2}(i, j)$, and a plurality of candidates can be considered.

[Equation 2]

$$I_{AP,2} = 2\pi m + I_{RP,2}(i,j) \quad (a)$$

There are a plurality of candidates for projection pixel positions having correspondence with the captured pixel positions, as shown in the equations below, where $i_p$ and $j_p(m)$ respectively show the $i_p$-th pixel from the left edge in the second direction and the $j_p(m)$-th pixel from the top edge in the first direction.

[Equation 3]

$$(i_p, j_p(m)) = \left( \frac{p_1 I_{AP,1}(i, j)}{2\pi}, \frac{p_2 I_{AP,2}(i, j, m)}{2\pi} \right) \quad (b)$$

Here, since there are the plurality of candidates for the projection pixel position, the defective pixel determination part 303 identifies a plurality of second 3D positions. On the other hand, since the coordinate values $i_p$ in the first direction of the projection pixel position are the same in the plurality of candidates, the defective pixel determination part 303 identifies one first 3D position. The defective pixel determination part 303 calculates a value of m indicating the second 3D position closest to the first 3D position corresponding to the same captured pixel position among the second 3D positions obtained for the plurality of candidates.

The defective pixel determination part 303 can determine whether or not the pixel at the captured pixel position is a defective pixel by determining whether or not a distance between the first 3D position and the second 3D position closest to the first 3D position exceeds a threshold value. With such configurations, the projection control part 301 can further reduce the number of light patterns to be projected onto the object to be measured. Therefore, the projection control part 301 can shorten the measurement time.

When projecting the light patterns in the second direction, the defective pixel determination part 303 can narrow down the plurality of candidates for the projection pixel position having correspondence with the captured pixel position in order to reduce the calculation amount. The defective pixel determination part 303 identifies the second 3D position for each of the plurality of candidates. By defining in advance a range of measurable 3D positions as a range which the second 3D position can assume, a range of m that can correspond to the plurality of candidates is limited, and thus the candidates can be narrowed down.

For example, when planes that sufficiently cover a range of measurable 3D space are placed on the nearest side and on the farthest side of the 3D geometry measurement apparatus 100, by measuring in advance pixel values of the respective planes onto which lateral light patterns are projected, the range of m that can correspond to the plurality of candidates can be calculated. It should be noted that since the pixel values of the lateral light patterns do not greatly change due to difference in the geometry of the object to be measured, there is an advantage that the range of m defined for the pixels at the respective captured pixel positions of the image capturing part 2 becomes relatively small.

The defective pixel determination part 303 can perform the same processing for light patterns other than the light patterns in the second direction, for example, light patterns in the first direction. In particular, in the case of the light patterns in the second direction, the defective pixel determination part 303 can greatly narrow down the candidates by defining the range of m using the above-described method, and therefore processing can be simplified.

In the above explanation, the projection control part 301 projects the projection image including the light patterns extending in the first direction and the projection image including the light patterns extending in the second direction onto the object to be measured. The present invention, however, is not limited to the example of projecting the light patterns extending in the first direction and the second direction, and the projection control part 301 may project a projection image including light patterns obtained by combining light patterns extending in arbitrary directions.

Also, the projection control part 301 may be configured to repeat the processing of projecting projection images including light patterns extending in another direction onto the object to be measured. For example, the projection control part 301 sequentially projects projection images including light patterns extending in the first direction to the N direction (N is the natural number). The projection control part 301 may be configured to stop projecting the projection images including the light patterns based on a range of defective pixels newly detected from the captured image obtained by projecting the projection image including the light patterns extending in the N-th direction. That is, the projection control part 301 may be configured to stop projecting the projection images including the light patterns when a range of defective pixels not detected from the captured image in which the light patterns extending in the first direction to the (N−1)-th direction are projected, among the defective pixels detected from the captured image in which the projection image including the light patterns extending in the N-th direction are projected, is equal to or less than a threshold value. The threshold value is, for example, a value indicating that the influence of multiply reflected light has become sufficiently small.

The projection control part 301 may sequentially project a plurality of projection images including light patterns those cycles of stripes are different from each other. For example, the projection control part 301 may project the projection image including the light patterns extending in the first direction onto the object to be measured, and then may additionally project the projection image including light patterns extending in the first direction and having different cycles onto the object to be measured. Also, the projection control part 301 may project the projection image including light patterns extending in the second direction onto the object to be measured, and then may additionally project the projection image including light patterns extending in the second direction and having different cycles onto the object to be measured. When the projection image including light patterns with the different cycles is projected, the phase of the multiply reflected light overlapping the direct light changes. For this reason, the defective pixel determination part 303 can detect the pixels affected by the multiply reflected light more accurately.

Also, in the above description, the example of the case where the projection control part 301 projects each projection image using projection light with the same wavelength was explained. However, the present invention is not limited to this case. For example, the projection control part 301 may project a plurality of projection images including light patterns extending in the first direction onto the object to be measured using light of a first wavelength, and project a projection image including light patterns extending in the second direction onto the object to be measured using light of a second wavelength. By adopting this configuration, the projection image including the light patterns extending in the first direction and the projection image including the light patterns extending in the second direction can be projected onto the object to be measured at the same time, and the amount of measurement time can be reduced. The threshold value may be changed with respect to each wavelength.

Also, in the above description, the example of the case where the projection control part 301 projects the projection image including the stripe patterns as the light patterns was explained. However, the present invention is not limited to this, and for example, the projection control part 301 may project a projection image including checkered patterns as light patterns. The projection control part 301 can project a projection image including any light patterns onto the object to be measured, provided that the relationship identification part 302 can identify a projection pixel position having correspondence with the captured pixel position by a single light pattern or a plurality of light patterns.

The defective pixel determination part 303 may output a determination result as to whether or not the pixel is a defective pixel. For example, the defective pixel determination part 303 displays the determination result on a display or transmits the determination result to an external PC. When the defective pixel determination part 303 outputs the determination result, the user who measures the geometry of the object to be measured can check the determination result, and if the user determines that the measurement accuracy does not reach a desired accuracy, the measurement accuracy can be improved by re-measurement or changing the placement position of the object to be measured.

Although the present invention has been described using the embodiments described above, the technical scope of the present invention is not limited to the ranges described in the above embodiments, and various modifications and changes can be made within the scope of the gist thereof. For example, the specific embodiment of the distribution and integration of devices is not limited to the above-described embodiment, and all or part of the embodiment can be configured to be functionally or physically distributed and integrated in arbitrary units. Also included in the embodiments of the present invention are new embodiments resulting from any combination of multiple embodiments. The effect of the new embodiment caused by the combination is the same as the effect of the original embodiment.

What is claimed is:

1. A three-dimensional geometry measurement apparatus that measures a three-dimensional geometry of an object to be measured by projecting, onto the object to be measured, a projection image including a light pattern in which luminance changes depending on a position, the three-dimensional geometry measurement apparatus comprising:
   a projection part that projects the projection image onto the object to be measured;
   an image capturing part that generates a captured image by capturing the object to be measured on which the projection image is projected;
   a relationship identification part that identifies a projection pixel position which is a position of a pixel of the projection image having correspondence with a captured pixel position which is a position of a pixel of the captured image;
   a defective pixel determination part that determines whether or not the pixel at the captured pixel position is a defective pixel on the basis of a positional relationship between (i) a projection light beam starting from the projection part and passing through the pixel at the projection pixel position and (ii) a captured light beam starting from the image capturing part and passing through the pixel at the captured pixel position having correspondence with the projection pixel position, and (i) identifies, as a first three-dimensional position, a position at which the captured light beam passing through the captured pixel position intersects with a projection light beam plane in a predetermined direction passing through the projection pixel position having correspondence with the captured pixel position, (ii) specifies, as a second three-dimensional position, a position at which the projection light beam passing through the projection pixel position intersects with the captured light beam plane in a predetermined direction passing through the captured pixel position, and (iii) determines that the pixel at the captured pixel position is a defective pixel when a distance between the first three-dimensional position and the second three-dimensional position is greater than a threshold value when determining whether or not the pixel at the captured pixel position is the defective pixel; and
   a geometry identification part that identifies the three-dimensional geometry of the object to be measured on the basis of pixel values of the captured pixel positions excluding the position of the pixel determined to be the defective pixel by the defective pixel determination part.

2. The three-dimensional geometry measurement apparatus according to claim 1, wherein the defective pixel determination part determines whether or not the captured pixel position is a defective pixel on the basis of correspondence between (i) a first plane determined by three or more of the first three-dimensional positions corresponding to three or more of the captured pixel positions within a predetermined range from the captured pixel position and (ii) a second plane determined by three or more of the second three-dimensional positions corresponding to three or more of the captured pixel positions.

3. The three-dimensional geometry measurement apparatus according to claim 1, wherein the geometry identification part identifies the three-dimensional geometry of the object to be measured on the basis of the mean value of three-dimensional coordinates of the first three-dimensional positions and the mean value of the second three-dimensional positions.

4. The three-dimensional geometry measurement apparatus according to claim 1, further comprising
   an abnormality detection part that obtains distances between the first three-dimensional positions and the second three-dimensional positions to detect an abnormality of the three-dimensional geometry measurement apparatus on the basis of a statistical quantity of distances obtained for a plurality of captured pixel positions.

5. The three-dimensional geometry measurement apparatus according to claim 1, wherein the projection part projects a projection image, from which all of the pixels at the projection pixel positions having the correspondence with the captured pixel positions determined to be defective pixels by the defective pixel determination part are excluded from among the plurality of pixels included in the projection image, onto the object to be measured again when the defective pixel determination part determines that a pixel at a captured pixel position is a defective pixel.

6. The three-dimensional geometry measurement apparatus according to claim 1, wherein the projection part projects a projection image, including only the pixels at the projection pixel positions having correspondence with the captured pixel positions determined to be defective pixels by the defective pixel determination part from among the plurality of pixels included in the projection image, onto the object to be measured again when the defective pixel determination part determines that a pixel at a captured pixel position is a defective pixel.

7. The three-dimensional geometry measurement apparatus according to claim 1, wherein the projection part projects a projection image including the light pattern extending in a first direction orthogonal to a plane including an optical axis of the image capturing part and an optical axis of the projection part, and a projection image including the light pattern extending in a second direction parallel to the plane including the optical axis of the image capturing part and the optical axis of the projection part.

8. The three-dimensional geometry measurement apparatus according to claim 1, wherein the projection part projects a projection image including the light pattern of a binary image and a projection image including the light pattern having a sinusoidal luminance distribution onto the object to be measured.

9. The three-dimensional geometry measurement apparatus according to claim 1, wherein the projection part sequentially projects a plurality of projection images including the light patterns whose cycles of stripes are different from each other.

10. A three-dimensional geometry measurement apparatus that measures a three-dimensional geometry of an object to be measured by projecting, onto the object to be measured, a projection image including a light pattern in which luminance changes depending on a position, the three-dimensional geometry measurement apparatus comprising:
    a projection part that projects the projection image onto the object to be measured;
    an image capturing part that generates a captured image by capturing the object to be measured on which the projection image is projected;
    a relationship identification part that identifies a projection pixel position which is a position of a pixel of the projection image having correspondence with a captured pixel position which is a position of a pixel of the captured image;
    a defective pixel determination part that determines the pixel at the captured pixel position is a defective pixel when a minimum distance between (i) a projection light beam starting from the projection part and passing through the pixel at the projection pixel position and (ii) a captured light beam starting from the image capturing part and passing through the pixel at the captured pixel position having correspondence with the projection pixel position is greater than a threshold value; and
    a geometry identification part that identifies the three-dimensional geometry of the object to be measured on the basis of pixel values of the captured pixel positions excluding the position of the pixel determined to be the defective pixel by the defective pixel determination part.

11. A three-dimensional geometry measurement method that measures a three-dimensional geometry of an object to be measured by projecting, onto the object to be measured, a projection image including a light pattern in which luminance changes depending on a position, the method comprising:
    projecting the projection image onto the object to be measured by a projection part;
    generating, by an image capturing part, a captured image by capturing the object to be measured on which the projection image is projected;
    identifying a projection pixel position which is a position of a pixel of the projection image having correspondence with a captured pixel position which is a position of a pixel of the captured image;
    determining whether or not the pixel at the captured pixel position is a defective pixel on the basis of a positional relationship between (i) a projection light beam starting from the projection part and passing through the pixel at the projection pixel position and (ii) a captured light beam starting from the image capturing part and passing through the pixel at the captured pixel position having correspondence with the projection pixel position;
    identifying, as a first three-dimensional position, a position at which the captured light beam passing through the captured pixel position intersects with a projection light beam plane in a predetermined direction passing through the projection pixel position having correspondence with the captured pixel position;
    specifying, as a second three-dimensional position, a position at which the projection light beam passing through the projection pixel position intersects with the captured light beam plane in a predetermined direction passing through the captured pixel position;
    determining that the pixel at the captured pixel position is a defective pixel when a distance between the first three-dimensional position and the second three-dimensional position is greater than a threshold value when determining whether or not the pixel at the captured pixel position is the defective pixel; and
    identifying the three-dimensional geometry of the object to be measured on the basis of pixel values of the captured pixel positions excluding the position of the pixel determined to be the defective pixel by the defective pixel determination part.

* * * * *